United States Patent
Strickland

(10) Patent No.: US 6,618,675 B2
(45) Date of Patent: Sep. 9, 2003

(54) SPEED CORRECTION USING CABLE TENSION

(75) Inventor: Robert W. Strickland, Austin, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 10/079,343

(22) Filed: Feb. 20, 2002

(65) Prior Publication Data

US 2002/0198661 A1 Dec. 26, 2002

Related U.S. Application Data

(60) Provisional application No. 60/271,786, filed on Feb. 27, 2001.

(51) Int. Cl.$^7$ ................................................ G01B 7/26
(52) U.S. Cl. ..................... 702/6; 73/152.02; 73/152.56; 340/854.2
(58) Field of Search ..................... 702/6–13; 73/152.02, 73/152.56; 340/854.9, 854.2, 854.1

(56) References Cited

U.S. PATENT DOCUMENTS

| | | | |
|---|---|---|---|
| 3,490,149 A | | 1/1970 | Bowers ........................ 33/133 |
| 3,490,150 A | | 1/1970 | Whitfill, Jr. .................. 33/133 |
| 3,862,499 A | | 1/1975 | Isham et al. .................. 33/312 |
| 3,882,474 A | | 5/1975 | Cain ........................... 340/177 |
| 4,346,593 A | * | 8/1982 | Howells et al. |
| 4,362,054 A | * | 12/1982 | Ringot |
| 4,545,242 A | * | 10/1985 | Chan |
| 4,556,884 A | * | 12/1985 | Howells et al. |
| 4,567,759 A | * | 2/1986 | Ekstrom et al. |
| 5,019,978 A | * | 5/1991 | Howard, Jr. et al. |
| 5,062,048 A | | 10/1991 | Coulter et al. .............. 364/422 |
| 5,522,260 A | * | 6/1996 | Chappellat et al. |
| 6,154,704 A | * | 11/2000 | Jericevic et al. |
| 6,256,587 B1 | * | 7/2001 | Jericevic et al. |

FOREIGN PATENT DOCUMENTS

GB        2129141        5/1984

OTHER PUBLICATIONS

*Accurate Depth Determination in Well Logging,* David. S.K. Chan, IEEE Transactions on Acoustics, Speech, and Signal Processing, vol. ASSP–32, No. 1, Feb. 1984 (7 p.).
*Optimized Speed Correction,* Mark G. Kerzner, SPWLA 39th Annual Logging Symposium, May 26–29, 1998 (10 p.).
*Real Time Speed Correction of Logging Data,* Vincent Belougne et al., SPWLA 37th Annual Logging Symposium, Jun. 16–19, 1996 (14 p.).

* cited by examiner

Primary Examiner—Donald E. McElheny, Jr.
(74) Attorney, Agent, or Firm—Conley Rose, P.C.

(57) ABSTRACT

A well logging system is disclosed having an improved speed correction apparatus and method. One embodiment comprises a logging sonde, a wireline cable, a distance sensor, a tension sensor, and a surface computer. The logging sonde moves through a wellbore while making logging measurements of the formation around the wellbore. The sonde includes an accelerometer to measure acceleration of the logging sonde. As the wireline cable is reeled in on the surface, the distance sensor detects the length of wireline cable that is retrieved. The tension sensor measures the tension in the wireline cable. The surface computer receives measurements from the accelerometer, the distance sensor, and the tension sensor, and determines intervals in which the logging tool is stuck. At least in part, this is done by finding "slow" intervals in which the wireline cable is stretching at about the same rate that the wireline cable is being reeled in.

26 Claims, 7 Drawing Sheets

SPEED CORRECTION USING CABLE TENSION

CROSS-REFERENCE TO RELATED APPLICATIONS

The present application claims priority to U.S. provisional application Ser. No. 60/271,786, filed Feb. 27, 2001 and entitled Speed Correction Using Z-Axis Accelerometer and Cable Tension Simultaneously.

BACKGROUND OF THE INVENTION

1. Field of the Invention

The present invention relates generally to apparatus and methods for determining the instantaneous "true" depth of a well logging tool suspended from a cable inside a well bore. More particularly, the present invention relates to apparatus and methods for determining the true tool depth corresponding to formation data measured by the tool while it is being raised or lowered inside a well bore. Still more particularly, the present invention relates to apparatus and methods for determining the true tool depth in real time from z-axis accelerometer and cable tension measurements.

2. Description of the Related Art

Well logging is a method of gathering information about subsurface formations by suspending a measurement tool from a cable, such as a wireline, within a well bore and raising or lowering the tool as it makes measurements along the well bore. For purposes of data analysis, it is important to accurately associate the true depth of the tool with the measurement sample obtained at that depth.

In a typical wireline logging system, the depth of the logging tool is taken to be the measured wireline length spooled out at the surface. The wireline length is measured by a sheave wheel, called a depth encoder, that rotates as the wireline is lowered or raised by the winch. A shaft disposed internally of the depth encoder generates pulses with each rotation, and these pulses are counted by the depth system to determine the length of wireline spooled out. The wireline is marked at regular length intervals with magnetic markers that are also counted by the depth system to correct for any accumulated errors. Finally, the depth system corrects for wireline stretch due to gravity.

Typically, logging signals are sampled downhole at fixed time intervals as the tool is being raised by the wireline at a constant speed. As samples are taken subsurface, the data samples are transmitted to the surface through electrical conductors in the wireline. The surface system then "resamples" the data, or in other words, converts the time-based data into depth-based data using fixed increments of depth as measured by the depth system at the surface.

This resampling process is accurate as long as the tool is moving at the same speed as the wireline at the surface. However, due to the combination of cable elasticity and irregular tool motion caused by friction between the tool and the well bore wall, the instantaneous speed of the tool may differ substantially from the speed of the wireline at the surface. For example, when there is a moderate amount of friction between the tool and the bore hole wall, slight slipping may occur, and cable elasticity may lead to tool bouncing, commonly called the "yo—yo" effect, or stick and slip movement. This yo—yo effect intensifies when there is sufficient friction to stop the tool until wireline tension overcomes static friction and tool motion resumes. When the speed of the tool differs from the speed of the wireline at the surface, the surface depth measurement will not match the true depth of the tool.

Speed correction is one known process for correcting the wireline depth recorded at the surface for irregular tool motion. The input for traditional speed correction software is data recorded by an accelerometer within the tool that has a measurement axis aligned with the axis of the tool. This is called a z-axis accelerometer. Straightforward integration of the accelerometer data is one speed correction method. Kalman filtering as described in U.S. Pat. No. 4,545,242 to Chan is another speed correction method. Both methods attempt to determine when the tool is stuck and to correct the measured tool depth accordingly. However, conventional speed correction algorithms have some shortcomings, such as difficulty in correctly identifying stuck intervals.

A further shortcoming conventional speed correction algorithms is as follows. Traditional speed correction methods are applied to correct the resampled, depth-based data, thus resampling the data a second time as a function of equal increments in the corrected depth. This poses several problems. First, logging tool strings comprise several different types of sensors having measurement points that are displaced from the bottom of the tool at various distances. The first depth-based resampling process will depth align these measurements before saving them in the database. Also, many measurements are averaged with spatial averaging filters to remove statistics or spatially deconvolve the data. However, traditional speed correction is applied before depth alignment and before any depth-based filtering, which causes duplicative processing.

As an example, speed correction may be used to depth-correct data from imaging tools that record an electrical or acoustic image of the borehole. These devices usually record all data at a single measurement depth, although there are several sensors located at different positions along the length of the tool, thus requiring depth alignment. To properly speed correct the data from these various sensors, the time-based data is first resampled into depth-based data with no depth alignment and no filtering. Then speed correction is applied to resample and depth correct the depth-based data. Finally the depth delays and filtering can be applied, thus requiring all the depth-based processing to be duplicated. To eliminate duplication in data processing, it would be advantageous to have a speed correction method that can be applied to the original, time-based data.

An additional complication is posed when speed correcting the data from non-imaging sensors. When a tool that has been stuck for several tens of seconds breaks free, the speed of the tool downhole can be several times the nominal logging speed. Data sampled during periods of rapid tool motion are sampled at a lower density (in samples per unit distance) than data sampled during periods of steady tool movement. Because speed correction is applied to the resampled, depth-based data, interpolation is required between samples to stretch out the data. However, if speed correction were instead applied to the time-based data before the resampling procedure, it is possible to fill in these low-density sections with actual data samples instead of interpolating. This provides another reason why it would be beneficial to have a speed correction method applicable to the original, time-based data. The improved speed correction system of the present invention overcomes the deficiencies of the prior art.

SUMMARY OF THE INVENTION

The present invention features an improved speed correction apparatus and method utilizing measurements from a z-axis accelerometer and measurements of wireline tension at the surface to better identify intervals where the logging tool is stuck against the well bore wall. The wireline tension may be measured by any known means, such as with a strain gauge load cell attached to a pulley at the top of the derrick. The z-axis accelerometer can be located anywhere along the length of the logging tool, as long as the entire tool behaves as a rigid body.

A preferred embodiment of the invention is a well logging system that comprises: a logging sonde, a wireline cable, a distance sensor, a tension sensor, and a surface computer. The logging sonde is configured to move through a wellbore while making logging measurements of the formation around the wellbore. The logging sonde includes an accelerometer configured to measure acceleration of the logging sonde. The wireline cable couples the logging sonde to a reel on the surface. As the reel reels in wireline cable, the distance sensor detects the length of wireline cable that is retrieved. The tension sensor is configured to measure the tension in the wireline cable. The surface computer receives measurements from the accelerometer, the distance sensor, and the tension sensor, and it is configured to determine intervals in which the logging tool is stuck. At least in part, this is done by finding "slow" intervals in which the wireline cable is stretching at about the same rate that the wireline cable is being reeled in.

The present invention comprises a combination of features and advantages which enable it to overcome various deficiencies of prior apparatus and methods. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiments of the present invention, reference will now be made to the accompanying drawings, wherein.

DETAILED DESCRIPTION OF THE PREFERRED EMBODIMENT

Figure 1:
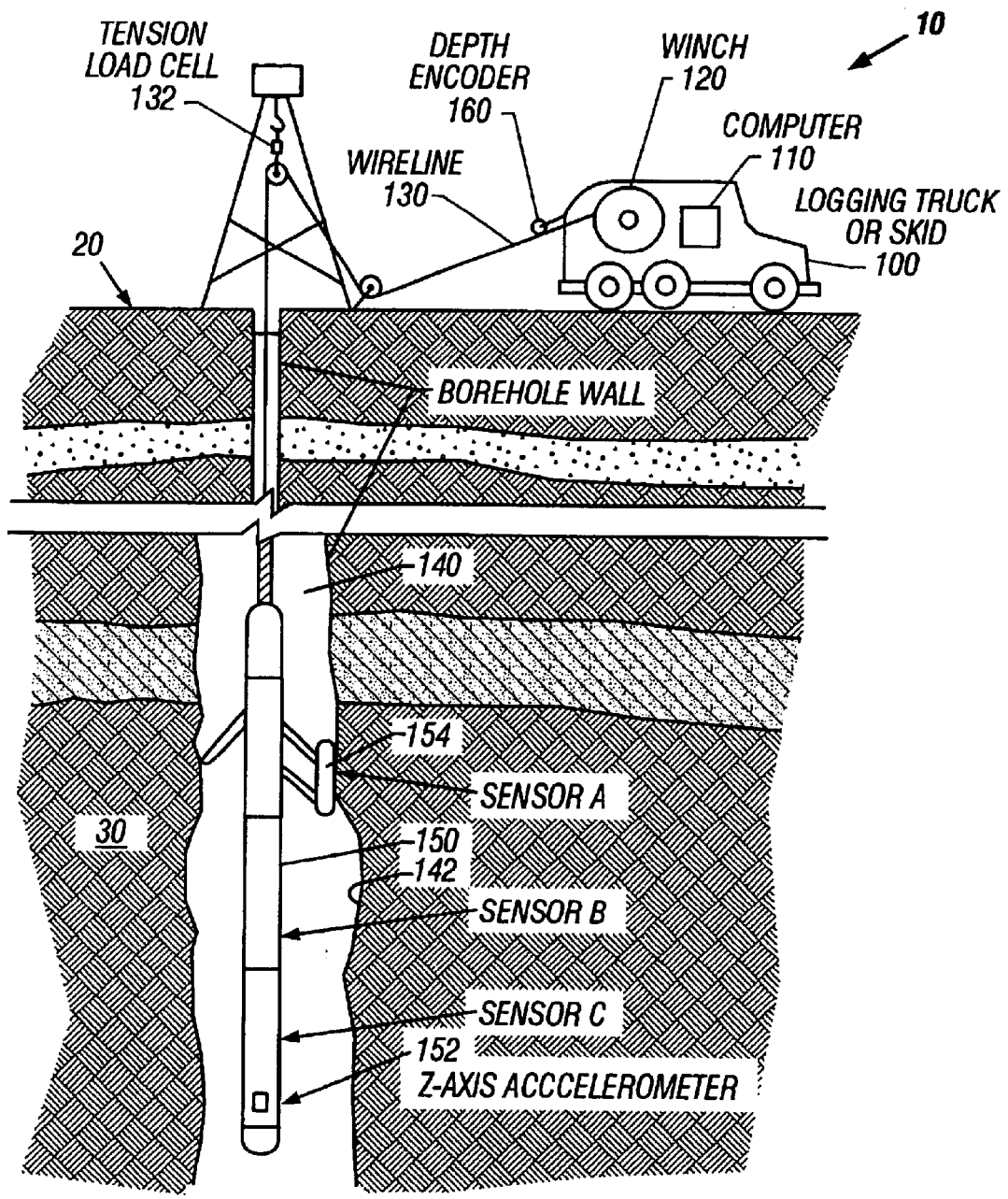
FIG. 1 is a schematic diagram of a drilling rig site showing a logging tool that is suspended from a wireline and disposed internally of a bore hole.

FIG. 1 depicts a typical well logging system. At a drilling rig site 10, a logging truck or skid 100 on the earth's surface 20 houses a data gathering computer 110 and a winch 120 from which a wireline 130 extends into a well bore 140 drilled into a hydrocarbon formation 30. The wireline 130 suspends a logging tool 150 within the well bore 140 to measure formation data as the logging tool 150 is raised or lowered by the wireline 130. The logging tool 150 includes a z-axis accelerometer 152 and several sensors A, B, C with measurement pads, such as pad 154 on sensor A, that may engage the internal wall 142 of the well bore 140.

As the logging tool 150 is raised or lowered within the well bore 140, it is important for the formation data that is measured by the tool 150 to be associated with the true depth of the tool 150 at that data collection position. A depth encoder 160 provides a measured depth of the logging tool 150 based on the amount of wireline 130 that has been spooled out from the winch 120. However, as previously described, when the speed of the tool 150 movement differs from the speed of the wireline 130 being spooled in by the winch 120, the measured depth will not match the true depth of the tool 150. Thus, as described in more detail below, to determine the true depth of the tool 150, the improved speed correction algorithm of the present invention utilizes data from the z-axis accelerometer 152 and data from a tension load cell 132 that measures tension in the wireline 130 at the surface 20.

The improved speed correction algorithm of the present invention begins with the following assumptions:

1. The wireline 130 stretches elastically.
2. The amount of wireline 130 stretch due to gravity is taken into account elsewhere.
3. The average acceleration along the axis of the tool 150 is zero.
4. The logging direction is upwards in the well bore 140.
5. The wireline 130 stretches less than 1% of its length.
6. The stretch coefficient of the wireline 130 is known to an accuracy of approximately ±10%.
7. The speed of the wireline 130 being spooled in by the winch 120 changes slowly.

The first assumption, that the wireline 130 stretches elastically, means that the wireline 130 length is the same before and after logging, such that any stretching during logging is not permanent.

The second assumption is valid because the logging system computer 110 includes hardware and/or software to compensate for wireline stretch due solely to gravity. This correction is of sufficiently low frequency that it can be ignored by the improved speed correction algorithm of the present invention.

The third assumption means that over a sufficiently long time, the average acceleration is zero. Therefore, the speed correction will average out to zero over a sufficiently long period of time. This assumption is valid because when the tool 150 gets stuck, it must eventually "catch up" to the measured depth based on the length of wireline 130 spooled out.

With respect to the fourth assumption, a logging direction is specified for performing the speed correction calculations.

The logging direction is assumed to be upward for purposes of describing the invention; however, the algorithm can easily be modified by one of ordinary skill in the art for a logging direction that is downward.

Regarding the fifth assumption, portions of the algorithm depend on an approximation that the amount of wireline 130 spooled in by the winch 120 during any stuck interval is a small fraction of the total amount of wireline 130 extending into the well bore 140.

With respect to the sixth assumption, portions of the algorithm rely on the logging speed not changing suddenly. This assumption may not hold true in the field because the operator will often slow or stop the winch, for example, to reduce pressure on the pad 154 to free the tool 150.

Regarding the last assumption, although the stretch coefficient of the wireline 130 is assumed to be known ahead of time, the algorithm also computes the stretch coefficient.

Therefore, if the stretch coefficient is unknown, the algorithm may be applied in two passes to perform the speed correction.

The following nomenclature is required for describing how the improved speed correction method of the present invention may be utilized to correct the measured depth of a logging tool 150:

t=elapsed time $z_0(t)$=measured tool depth (measured by the depth encoder 160)

$a_z(t)$ measured z-axis acceleration (measured by the accelerometer 152)

f(t)=line tension at the surface (measured by the tension load cell 132)

S=wireline stretch coefficient=Δ length/length/pound z(t)=true tool depth (unknown, speed corrected)

v(t)=true tool velocity d(t)=depth correction

In addition to the measured tool depth $z_0(t)$ at any particular elapsed time t based on the depth encoder 160 reading, the improved speed correction algorithm of the present invention relies primarily on two measurements: the z-axis acceleration $a_z(t)$ measured subsurface in the well bore 140 by the z-axis accelerometer 152, and the line tension f(t) measured on the surface 20 by the tension load cell 132.

Figure 2A:
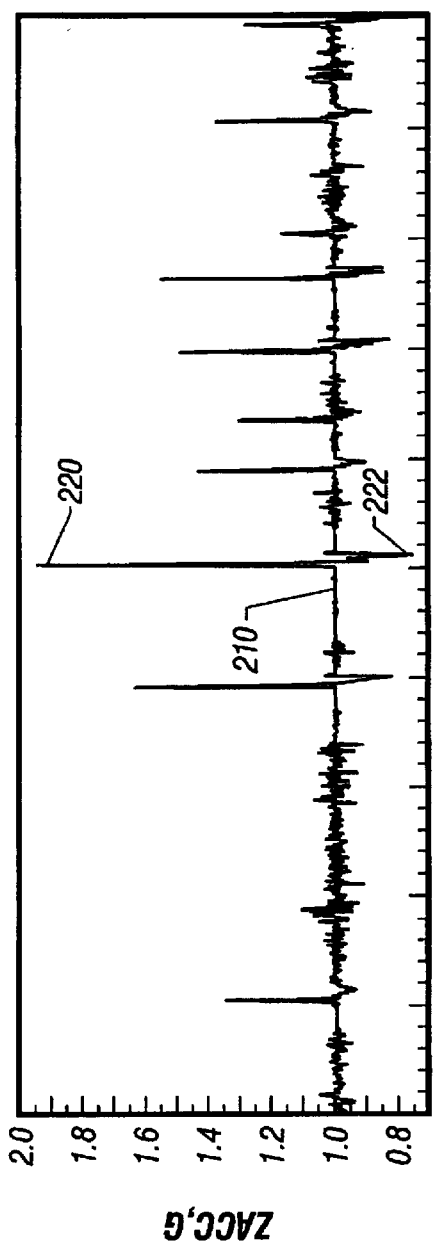
FIG. 2A is a graph of z-axis accelerometer data versus measured logging tool depth when the logging tool is experiencing severe stick and slip motion downhole.
Figure 2B:
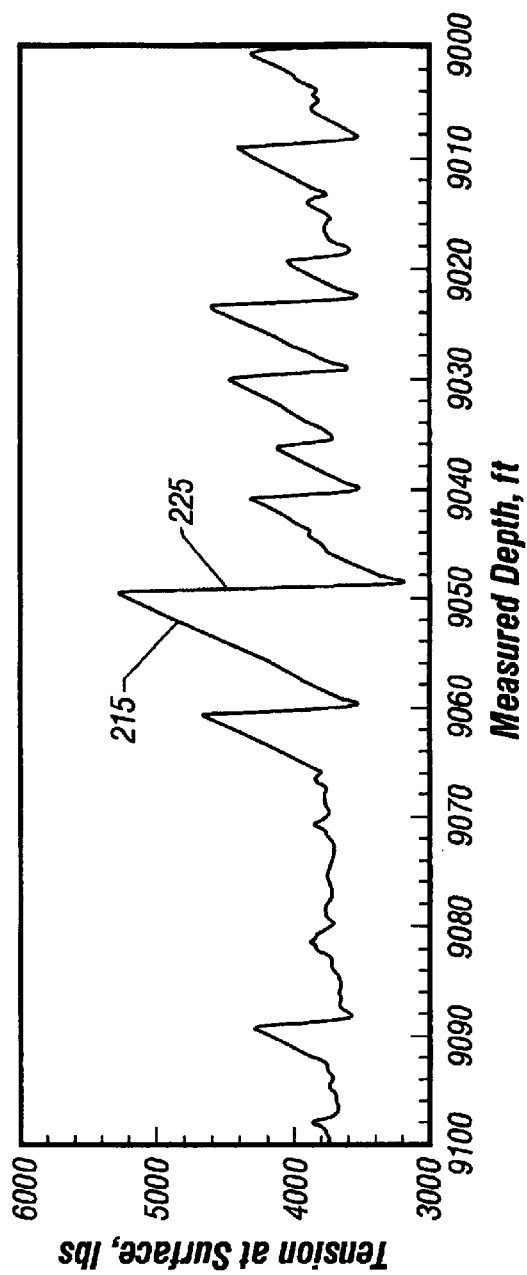
FIG. 2B is a graph of wireline tension measured at the surface versus measured logging tool depth during the severe stick and slip motion corresponding to the data of FIG. 2A.

Referring now to FIGS. 2A and 2B, these graphs depict measurements from the z-axis accelerometer 152 and the tension load cell 132, respectively, versus measured tool depth as determined by the depth encoder 160. The acceleration data on the vertical or Y-axis of FIG. 2A is expressed in units of the earth's gravity, G, where one G equals approximately 9.81 m/sec$^2$. The well bore 140 is substantially vertical, so the baseline acceleration is near one G. The horizontal or X-axis of FIGS. 2A and 2B show measured depth decreasing to the right, and although not shown, time is increasing to the right.

FIGS. 2A and 2B represent data for a section of well bore 140 for which the logging tool 150 is experiencing severe stick-slip motion due to friction between the tool 150 and the internal wall 142 of the well bore 140. When the tool 150 becomes stuck, such as in the region of measured depth from 9060–9050 feet, the accelerometer 152 reads approximately one G as shown at 210, and the tension builds approximately linearly with decreasing depth as shown at 215. When the tool breaks free, such as, for example, at the measured depth of approximately 9050 feet, the accelerometer 152 reading climbs rapidly to a peak value as shown at 220, and then decreases just as rapidly to a low value as shown at 222. During this interval, the tension also falls very rapidly as shown at 225.

The improved speed correction algorithm of the present invention utilizes the data of FIGS. 2A and 2B to determine the amount of depth correction required at each measured depth, or X-axis point. The data obtained by the logging tool 150 can then be resampled versus the true tool depth z(t), which equals the measured depth $z_0(t)$ plus the depth correction d(t).

Figure 3A:
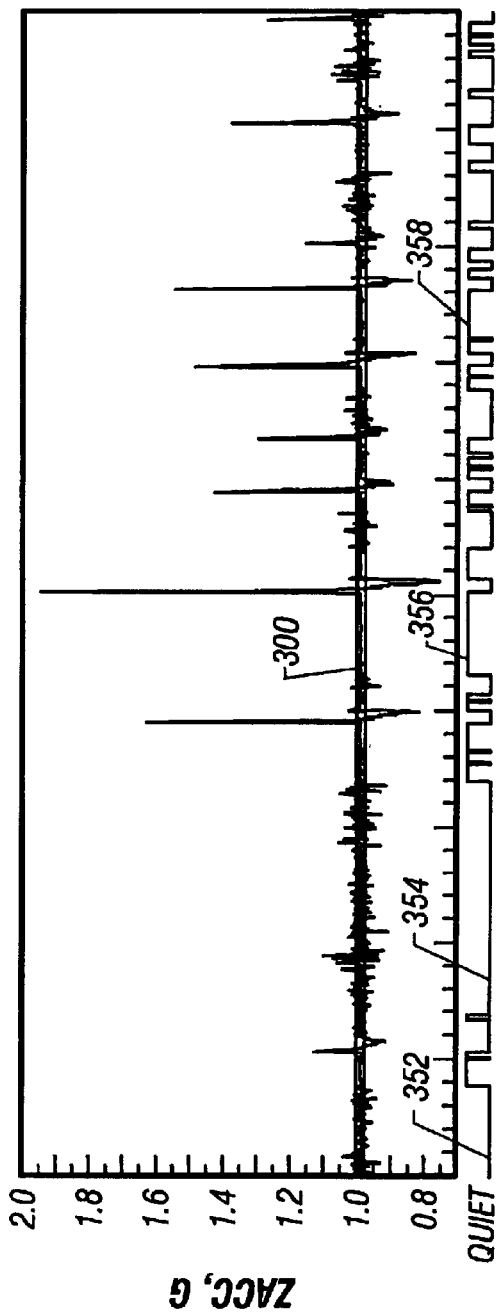
FIG. 3A is a graph of z-axis accelerometer data versus measured logging tool depth when the logging tool is experiencing severe stick and slip motion downhole.

FIG. 3A is a graph of the raw z-axis accelerometer measurement $a_z(t)$, which is given by the following equation:

$$a_z(t)=a(t)+g(t)+C \qquad (1)$$

where:

a(t) = acceleration along the z-axis of the tool 150;

g(t) = acceleration component of gravity that lies along the z-axis of the tool

= cosine of the angle of deviation of the well bore 140; and

C = the slowly varying offset.

C is an accelerometer error signal that may or may not be present. Downhole, it is not generally possible to distinguish C from g(t) based only upon the z-axis accelerometer measurement $a_z(t)$. However, the first step in processing the accelerometer readings $a_z(t)$ is to remove the slowly-varying offset corresponding to the baseline or background acceleration due to both gravity g(t) and C. FIG. 3A shows this baseline acceleration as the heavy shaded line 300 at approximately one G. Without prior knowledge of the deviation of the well bore 140, an averaging low-pass-filter is used to estimate g(t)+C and subtract it out.

$$a(t) \approx a_z(t) - a_{z,av}(t) \qquad (2)$$

where $a_{z,av}(t) \approx g(t)+C$ based on low-pass filtering.

A digital low-pass filter of about 20 seconds was found to produce an acceptable estimate of the background acceleration $a_{z,av}(t)$. The low-pass filter must be capable of tracking changes in gravity as the angle of well bore deviation changes. For example, at a logging rate of 30 ft/min, a 20 second filter will cover a length of 10 ft. If it is desirable for the gravity to change less than 0.01 G over this 10 ft window, then the maximum build rate is 5.7°/100 ft times the cosine of the deviation angle. The build rate is the change (in degrees) of the radius of curvature of the well bore over a 100 foot length of well bore. In the above example, if the build rate exceeds the maximum, the filter, which is designed to detect only the background acceleration g(t)+C, will also detect an error due to the z-axis component of gravity changing faster than the time constant of the filter. Actually, if the build rate is constant, the moving average filter will track the mean. Only sudden changes in the build rate will not be tracked.

This method differs from the method disclosed in U.S. Pat. No. 4,545,242 to Chan, which requires a three-axis accelerometer to estimate the deviation. The Chan method assumes that the baseline acceleration can be determined by measuring the components of acceleration along all three axes (x, y, and z), and taking the square root of the sum of the squares of those components. This calculation provides a measure of g(t), but the Chan method neglects C as part of the background acceleration.

Figure 3B:
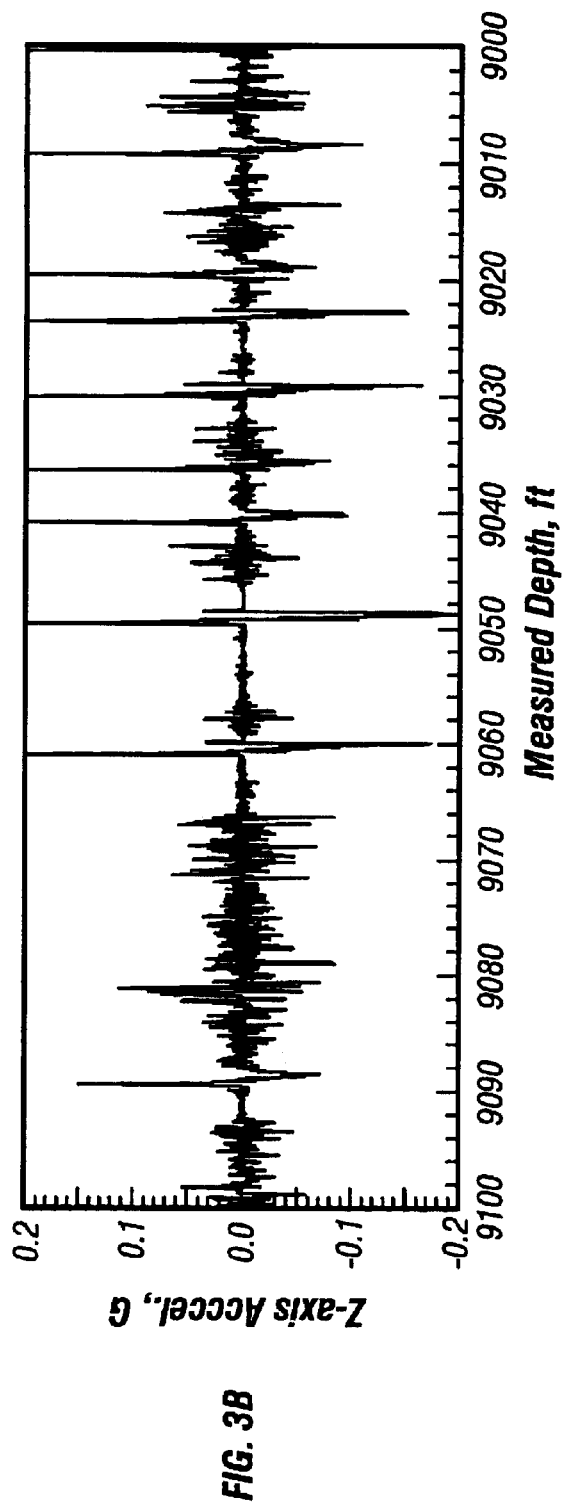
FIG. 3B depicts the FIG. 3A acceleration data after the background acceleration due to gravity has been subtracted.

FIG. 3B depicts the data of FIG. 3A after subtracting the background acceleration $a_{z,av}(t)$. The vertical or Y-axis scale of FIG. 3B is also narrowed to better show the acceleration a(t) of the tool 150 along the measured depth. With the background acceleration $a_{z,av}(t)$ subtracted out, it is now possible to begin locating intervals along the measured depth where the tool 150 is stuck.

It is beneficial to define an indicator called a QUIET flag, which is shown between FIGS. 3A and 3B. The QUIET flag is indicated in the lower, FALSE position, such as at 352, 354, for periods where the acceleration a(t) exceeds a set low threshold value. The QUIET flag is indicated in the upper, TRUE position, such as at 356, 358 for periods where the acceleration a(t) falls below a set low threshold value of acceleration within a moving window of time, for example, approximately one second. Thus, the QUIET flag will be TRUE in zones of low acceleration, which provides an indication of zones where the tool may be stuck.

However, due to the mathematical relationship between the variables, if the velocity v(t) is constant, then acceleration a(t) is zero. Thus, regardless of the value of the velocity v(t), if that velocity v(t) remains constant, then the acceleration a(t) is zero. For example, if the tool 150 is moving very smoothly at the same velocity v(t) as the wireline at the surface, the acceleration a(t) is zero. Likewise, if the tool is stuck and v(t) is zero, the acceleration a(t) is also zero. Therefore, although the QUIET flag is TRUE in low acceleration intervals, such as at the baseline acceleration 300 as indicated by the QUIET flag at 356, it is generally not possible to set a low threshold level of acceleration a(t) that is sufficiently low enough to distinguish stuck zones from zones where the tool 150 is moving smoothly at a constant velocity v(t).

This distinction is important because, in the case of a stuck tool 150, the speed correction algorithm must discard all data, whereas in zones where the tool 150 is moving smoothly at a constant velocity v(t), the data is meaningful, and no speed correction is required. Even when the tool 150 is substantially stuck, the tool 150 will often continue to make very small movements that produce measurable accelerations a(t). Thus, a threshold acceleration a(t) that is set too low will indicate that the tool 150 is moving when, in actuality, there is no significant movement. Alternatively, a threshold acceleration a(t) that is set below the noise level will never indicate that the tool 150 is stuck.

Another complication is that the low-pass filter measuring the background acceleration $a_{z,av}(t)$ can have small errors. Therefore, the threshold level of acceleration a(t) must be set above this error level. Accordingly, by attempting to set a low level threshold acceleration a(t) such that the QUIET flag is only indicated for stuck intervals, some intervals of very smooth tool motion will also be indicated. To address this problem, the algorithm of the present invention utilizes the measurements of the z-axis accelerometer 152 in combination with the measurement of cable tension taken at the surface by the tension load cell 132 to determine stuck intervals.

Figure 4A:
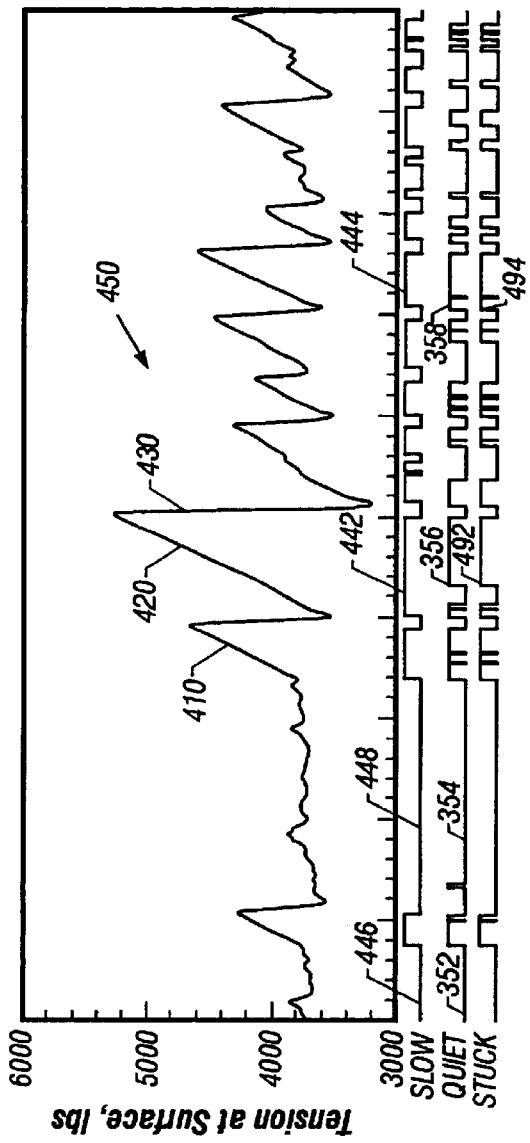
FIG. 4A is a graph of wireline tension measured at the surface versus measured logging tool depth during the severe stick and slip motion corresponding to the data of FIG. 3A.

FIG. 4A is a graph of the tension measured at the surface f(t) by the tension load cell 132 versus the measured depth of the tool 150 as it moves upwardly within the well bore 140. Areas of increasing tension, such as at 410, 420, correspond to depth locations where the tool 150 is experiencing high friction against the well bore wall 142, and may be stuck.

The tension measured at the surface f(t) comprises both static and dynamic tension. The static tension is the sum of the weight of the tool 150 plus the weight of the wireline 130. Static tension is determined when the winch 120 is stopped and the tool 150 is free to move. The weight of the tool 150 and wireline 130 submerged in the mud column is less than the weight in air due to buoyancy. Dynamic contributions to tension include frictional and hydraulic drag forces that will increase with increasing logging speed. These dynamic components are approximately constant for a given logging speed.

For purposes of speed correction, the data of primary interest are the component of tension caused by the tool sticking and the resulting wireline stretch. When the tool 150 gets stuck against the well bore wall 142, the winch 120 keeps turning and the wireline 130 stretches. The wireline 130 stores energy as the tension in the wireline 130 builds, such as, for example, the tension buildup 420 shown in FIG. 4A at a measured depth in the range of approximately 9060–9050 feet. When the force of tension f(t) in the wireline 130 is sufficient to overcome the static friction caused by the tool 150 being stuck against the well bore wall 142, the tool 150 breaks free and accelerates upwardly. Simultaneously, gravity, dynamic friction, and drag oppose this upward acceleration of the tool 150.

When the tool 150 breaks free and accelerates upwardly, the wireline tension f(t) decreases, such as, for example, the tension reduction 430 shown in FIG. 4A at a measured depth in the range of approximately 9050–9048 feet. Such tension reduction results from potential energy stored in the wireline 130 being converted into kinetic energy. Often the tool 150 will bypass the equilibrium stuck position, causing the wireline 130 to slacken. Gravity and friction continue to oppose the upward velocity of the tool 150, often causing it to become stuck again. In stick-slip motion, which is indicated by an increase and sudden decrease in tension, the tool 150 can be, on average, stuck for longer periods of time than it is moving. FIG. 4A depicts the tension increases and decreases associated with stick-slip motion in the region labeled 450 at a measured depth in the range of approximately 9066–9000 feet.

The wireline 130 generally behaves like an ideal spring whose stiffness (spring constant) is inversely proportional to its length. The amount of stretch, $\Delta z$, is related to the change in tension measured at the surface, $\Delta f$, by:

$$\Delta z = S \times z_0 \times \Delta f \tag{3}$$

where $S \times z_0 = 1/k$, and k=spring constant in Hooke's Law.

In general terms, the longer the spooled out wireline 130, the easier it is to stretch. In the continuous case where the tool 150 is moving, this relationship can be generalized as:

$$z_0(t) - z(t) = S \times z_0(t) \times [f(t) - f_{av}(t)] \tag{4}$$

where
  $z_0(t)$=measured depth;
  $z(t)$=true depth
  f(t)=tension measured at the surface (graphed in FIG. 4A)
  $f_{av}(t)$=baseline, time-averaged tension.

The baseline tension $f_{av}(t)$ will vary with depth and logging speed as the weight of the wireline 130 and the frictional forces change. The baseline tension $f_{av}(t)$ is the slowly-varying tension under smooth tool motion conditions.

The stretch coefficient S has dimensions of length divided by length divided by weight. A typical value for a seven conductor logging cable is 0.6 ft per 1000 ft per 1000 lb. That is, if a 1000 lb weight is suspended from a 1000 ft length of cable, it will stretch 0.6 ft. The same weight suspended from a 2000 ft cable will result in twice as much stretch, or 1.2 ft.

It is possible to use equation (4) directly to speed-correct a log, which can yield substantial improvements in log quality where tool sticking is moderate. However, the quality of this speed correction mode is limited by several complicating factors. First, the stretch coefficient S must be known beforehand. Further, the long length of wireline 130 acts as a low-pass filter, so the tension measured at the surface f(t) does not contain the high-frequency information needed to correct fine features (on the order of 0.1 ft) due to small-scale variations in tool speed v(t). Changes in tension propagate as waves up and down the wireline 130. These propagating waves have a finite speed that is related to the compressional sound velocity of the wireline 130. Therefore, the increase in tension caused by a tool 150 getting stuck downhole will not be detected immediately, but will instead be detected at the surface at some later point in time. In practice, it might be possible to account for this with a time shift proportional to the measured depth.

Another practical consideration is that equation (4) requires an estimate of the background tension, $f_{av}(t)$, which is not trivial. For example, consider the graph of FIG. 2B, which shows the tension f(t) measured at the surface. The background tension $f_{av}(t)$ can visually be estimated to be approximately 3700 lbs. Since the wireline 130 is more likely to be stretched than it is to be slack, a simple moving average filter applied as a function of time will miscalculate the background tension $f_{av}(t)$. However, if tension is used only as an indicator of when the tool 150 is stuck, these problems are of lesser importance.

To perform that analysis, the first time derivative of equation (4) based on tension may be used to determine the tool velocity, and by determining where the tool velocity is at or near zero, an indication of where the tool 150 may be stuck is provided. The first time derivative of equation (4) is:

$$z_0'(t)-z'(t)=(S \times z_0(t) \times [f'(t)-f_{av}'(t)])+(S \times z_0'(t) \times [f(t)-f_{av}(t)]) \quad (5)$$

where the primes (') indicate differentiation with respect to time.

Since depth is decreasing with time, $z_0'(t)$ is simply the negative of the line speed measured at the surface. To simplify equation (5), since $f_{av}(t)$ varies slowly as compared to f(t), $f_{av}'(t)$ is negligible as compared to f'(t). Therefore, equation (5) may be simplified as follows:

$$z_0'(t)-z'(t)=(S \times z_0(t) \times f'(t))+(S \times z_0'(t) \times [f(t)-f_{av}(t)]) \quad (6)$$

Rearranging terms gives:

$$z_0'(t) \times (1-S \times [f(t)-f_{av}(t)])-z'(t)=S \times z_0(t) \times f'(t) \quad (7)$$

Returning momentarily to equation form, the following relationship is noted:

$$S \times [f(t) - f_{av}(t)] = \frac{z_0(t) - z(t)}{z_0(t)} \quad (8)$$

Since the wireline 130 typically stretches less than 0.1% of its length (per assumption 5), the term $(z_0(t)-z(t))/z_0(t)$ is much less than one, so the term $S \times [f(t)-f_{av}(t)]$ is negligible. Therefore, after rearranging terms, an expression for tool velocity z'(t) as measured by the tension f(t) can be expressed as follows:

$$z'(t)=z_0'(t)-[S \times z_0(t) \times f'(t)] \quad (9)$$

Figure 4B:
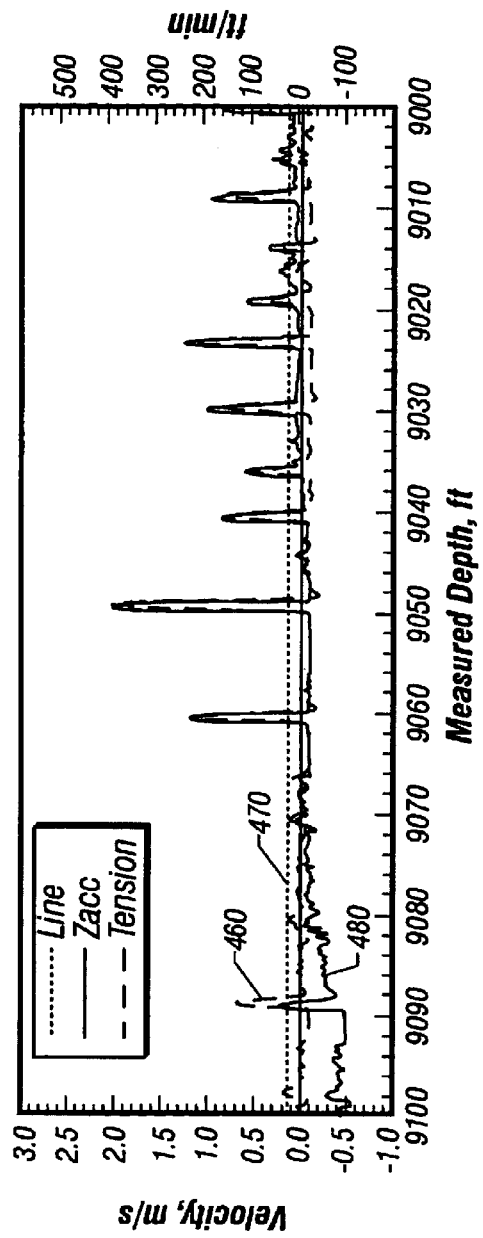
FIG. 4B is a graph of computed tool velocities versus measured logging tool depth during the severe stick and slip motion corresponding to the data of FIG. 4A.

Accordingly, after simplifying equation (5) based on a few assumptions, equation (9) provides an expression for tool velocity z'(t) that does not depend on the background tension, $f_{av}(t)$. The variable f'(t) is the first time derivative of the tension f(t) measured at the surface, and f'(t) can be determined by numerical differentiation. Thus, equation (9) provides an estimate of the downhole tool velocity z'(t) based only upon measurements taken at the surface, and the formula is valid whether the tool 150 is stuck or moving. FIG. 4B shows a dashed curve 460 of the tension-based tool velocity z'(t) versus the measured depth of the tool 150 as it moves upwardly in the well bore 140. Also shown in FIG. 4B is a dotted curve 470 of the velocity of the wireline 130 being spooled in at the surface and a solid curve 480 of the tool velocity based on measurements from the z-axis accelerometer, as further described below.

Equation (9) assumes that the stretch coefficient S is known. If the stretch coefficient S is unknown, it can be estimated by utilizing measurements in the stuck tool example, where the tool velocity is zero: z'(t)=0, therefore:

$$z_0'(t)_{stuck}=S \times z_0(t) \times f'(t) \quad (10)$$

or $$S_{stuck}(t) = \frac{z_0'(t)}{z_0(t) \times f'(t)} \quad (11)$$

Thus, equation (11) provides a means for estimating the stretch coefficient $S_{stuck}(t)$ for each interval where the tool 150 is stuck.

To utilize tension as an indicator of when the tool is stuck, a new variable u, called "slowness", is defined as:

$$u(t) = \frac{S \times z_0(t) \times f'(t)}{z_0'(t)} \quad (12)$$

where equation (12) is derived by rearranging equation (11). When the tool is moving smoothly, only the background tension $f_{av}(t)$ is present and f'(t)≈0 thereby making u(t)≈0. When the tool is stuck, u(t)≈1 (from equation (10)). If tension is decreasing rapidly, u(t)<0.

Between FIGS. 4A and 4B, a logical flag called SLOW is indicated as TRUE, such as at 442, 444, or FALSE, such as at 446, 448, based on a comparison of u(t) to a threshold as follows:

$$SLOW = \begin{cases} TRUE; & u(t) > 0.8 \text{ within a moving time window} \\ FALSE; & \text{otherwise} \end{cases} \quad (13)$$

The threshold setpoint of 0.8 is somewhat arbitrary but allows for a margin of error when estimating S. A moving window of time of approximately one second was experimentally found to be sufficient.

The value of u(t)>1 if the tool 150 is moving downwardly within the well bore 140 while the wireline 130 is moving upward at the surface. The value of u(t)>1 also if the wireline 130 is pinched and stuck somewhere above the tool 150 within the well bore 140 by a distance that is a significant fraction of the depth of the tool. Then f'(t) is greater than nominal (a shorter wireline 130 has a stiffer spring constant k), so tension builds more rapidly with decreasing measured depth $z_0(t)$. Further, the value of u(t) may exceed one if S is incorrectly specified, in which case the speed correction will be off. Therefore, another threshold may be set above where u(t)=1, such as at approximately u(t)=1.2, to create a PINCHED flag as follows:

$$\text{PINCHED} = \begin{cases} \text{TRUE;} & u > 1.2 \\ \text{FALSE;} & \text{otherwise} \end{cases} \quad (14)$$

Referring now to the SLOW and QUIET logical flags shown between FIGS. 4A and 4B, at locations where the measurements made by the tension cell 132 indicate that the velocity is SLOW, such as at 442, 444, while simultaneously the accelerometer 152 indicates that the acceleration is QUIET, such as at 356, 358, a new logical flag called STUCK will be TRUE, such as at 492, 494. Therefore, $$\text{STUCK=SLOW AND QUIET} \quad (15)$$

Accordingly, the STUCK flag is the logical intersection of the SLOW and QUIET intervals. Since the SLOW and QUIET flags are based on moving windows of time, the STUCK flag only indicates stuck intervals of duration greater than the moving window of time such as, for example, one second. Therefore, the tool 150 can be in stick-slip motion for periods of less than about one second and never be considered STUCK.

Once the STUCK flag is used to locate the positions where the tool 150 is stuck, speed correction is applied. The goal is to determine the true depth of the tool 150 with respect to time. First, an expression for the velocity based on measurements made by the z-axis accelerometer 152 can be derived by integrating the accelerometer measurement with respect to time. However, integrating the measured acceleration $a_z(t)$ without considering the slowly varying gravity term would result in a velocity curve that increases linearly with time at the acceleration of gravity, about 32 ft/sec$^2$ in a vertical well bore 140. Therefore, to get a better derived velocity from the measured acceleration $a_z(t)$, the low-frequency background acceleration due to gravity $a_{z,av}(t)$ must be subtracted before integrating. Thus, the accelerometer $a_z(t)$ measurement minus the acceleration due to gravity $a_{z,av}(t)$ is integrated with respect to time to result in the true velocity, v(t) plus an error term $v_\epsilon(t)$.

$$v_0(t) = \int_0^t [a_z(t) - a_{z,av}(t)] dt \quad (16)$$
$$= v(t) + v_\epsilon(t)$$

where $v_\epsilon(t)$=slowly-varying error resulting from integrating errors and estimating $a_{z,av}(t)$.

FIG. 4B compares the velocity z'(t) computed from the tension 460 to the velocity $v_0(t)$ computed from the accelerometer 480. The line speed is shown as the dotted curve 470. Although the two velocity curves 460, 480 compare well in character, the accelerometer-derived velocity 480 provides more detail than the tension-derived velocity 460, and there is a wandering baseline in the accelerometer-derived velocity curve 480, which is caused by the slowly-varying error $v_\epsilon(t)$.

To determine the accelerometer-derived position of the tool 150, the measured velocity $v_0(t)$ may be integrated with respect to time, but first $v_\epsilon(t)$ is preferably subtracted to adjust the baseline of the velocity curve 480. One way of correcting for this variable baseline $v_\epsilon(t)$ is by high-pass filtering, or subtracting a moving-average velocity. However, because the tool 150 can be stuck for long measured depths, such as approximately 15 feet, this corresponds to a stuck duration of approximately 30 seconds assuming a logging speed of 30 feet/minute. An averaging filter should be more than twice this duration, but this was determined experimentally to be too long to track the $v_\epsilon(t)$. Even visually, it is difficult to determine an estimated baseline velocity. However, by unambiguously identifying stuck intervals, because the tool velocity is zero where the tool is stuck, then $v_\epsilon(t)$ can be accurately estimated in these stuck intervals.

An estimate of the velocity error term can also be determined in intervals where the tool 150 is not stuck for a significant period of time. Based on the STUCK flag, a new flag called FREEMOVE can be set that is TRUE if the tool 150 is not STUCK anywhere inside a moving window of time spanning approximately a few seconds. In these intervals, where the FREEMOVE flag is TRUE, the average tool velocity must equal the line speed z'(t). Therefore, since the velocity is known where the tool is stuck and where it is moving freely, an accurate estimate of the velocity error term $v_\epsilon(t)$ is obtainable in these intervals. In intervals where neither the STUCK, or FREEMOVE flags are TRUE, it can be assumed that the velocity error term varies linearly with time between those intervals where it is directly obtainable.

FIG. 4B is a graph of the velocity derived from the tension z'(t) (equation (9)), indicated as curve 460, and the velocity derived from the accelerometer $v_0(t)$, indicated as curve 480, which differ in at least three discernable ways. First, the accelerometer-derived velocity 480 includes a slowly-varying error or offset, which is noticeable because the stuck zones should be at zero velocity, but they are not. Second, there is a slight shift in measured depth between the curves 460, 480, which is due to the sound velocity traveling through the wireline 130. Namely, it takes a finite period of time for a change in tension within the well bore 140 to propagate up the wireline 130 to the tension load cell 132 at the surface where the tension f(t) is measured. Third, the accelerometer-derived velocity 480 has more high-frequency detail.

The similarity of these two curves 460, 480 can be used to derive a better estimate of the stretch coefficient S. If in the first pass the stretch coefficient S is found to be incorrectly specified, the operator is able to detect the error in the stretch coefficient S, as further described below, and then apply the algorithm a second time with the correct value of the stretch coefficient S to obtain an accurate depth correction.

One way to estimate the relative error in the stretch coefficient S is to dynamically compare the two velocity curves 460, 480. The differences between the curves 460, 480, as described above, occur in two frequency bands. The offset is in a very low frequency band, and the difference in measured depth caused by sound travelling through the wireline 130 is relatively high frequency. If the two curves 460, 480 are bandpass filtered, these differences will be substantially eliminated. Then, the ratio of the two bandpass-filtered velocities 460, 480 can provide an indication of the relative error in the stretch coefficient S. However, calculating the ratio of two oscillatory signals is difficult because when the denominator is near zero, the ratio becomes very large. One practical way around this problem is to calculate the root mean square (RMS) value of each signal over a moving window of time and then take the ratio of the RMS values. The RMS is nonnegative by definition.

Thus, in summary, the method is to bandpass filter both velocity signals 460, 480, then pass each of the bandpass filtered signals through moving RMS filters, and finally to take the ratio of the RMS filter outputs. This ratio equals the relative error in the stretch coefficient S. If this ratio varies approximately linearly with depth, that is an indication of a pinched wireline 130. If instead the ratio differs from unity and is approximately constant over the entire range of depths, then the ratio equals the ratio between the actual and input stretch coefficients S.

The background velocity $v_b(t)$ is estimated as follows:

$$v_\varepsilon \approx v_b(t) \equiv \begin{cases} \overline{v_0(t)}; & \text{FREEMOVE} \\ v_0(t) - z_0'(t); & \text{STUCK} \\ \text{linearly varying with time;} & \text{otherwise} \end{cases} \quad (17)$$

Thus, where the tool 150 is moving freely, the background velocity $v_b(t)$ is set equal to the average value of the acceleration-determined velocity $v_{0,av}(t)$. Where the tool 150 is stuck, the background velocity $v_b(t)$ is set equal to the difference between the acceleration-determined velocity $v_0(t)$ and the linespeed. This is equivalent to defining a coordinate system that moves uphole at the winch speed. If the winch speed changes rapidly, there will be an additional pseudo-force that is not accounted for.

Figure 5A:
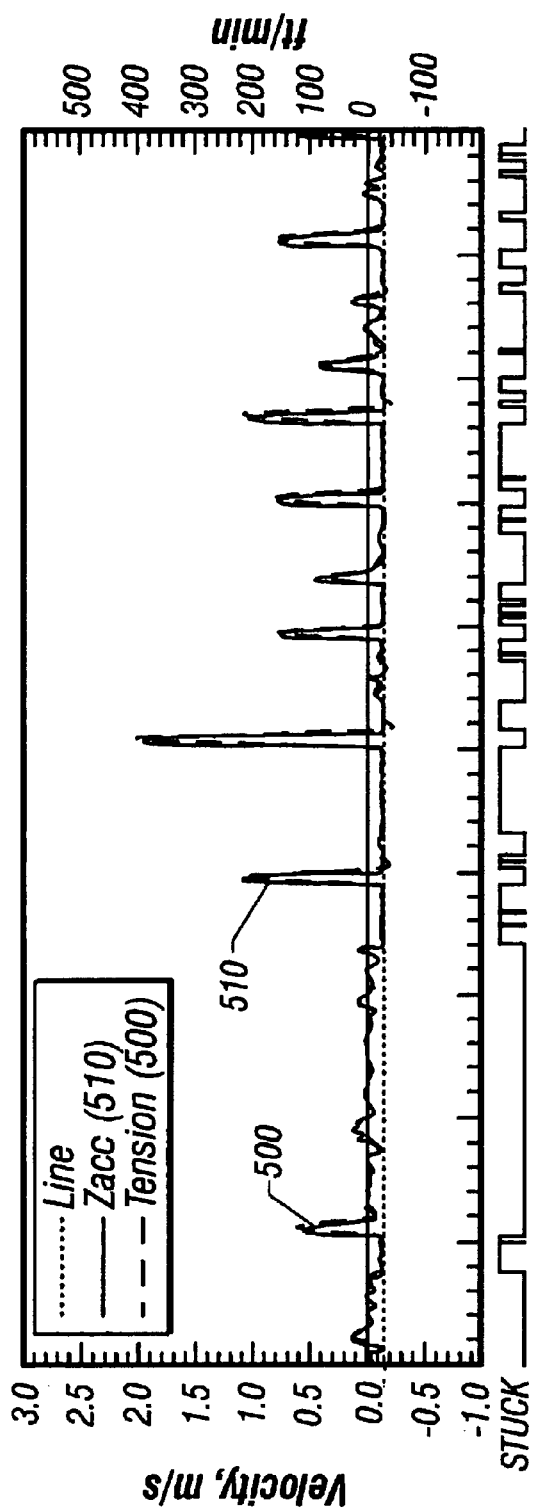
FIG. 5A is a graph of the FIG. 4A velocity data after the background velocity has been subtracted.

FIG. 5A compares the tension-derived velocity z'(t), shown as the dashed curve 500, to the accelerometer-derived velocity $v_0(t)$, shown as the solid curve 510, after the baseline velocity $v_b(t)$ has been subtracted. Curves 500 and 510 are very similar in magnitude, but there is a slight offset horizontally. Also, the velocity curve 510 derived from the accelerometer $v_0(t)$ has finer detail than the velocity curve 500 derived from the tension z'(t).

To determine the depth correction, the accelerometer-derived velocity $v_0(t)$ minus the estimated background $v_b(t)$ is integrated:

$$d_0(t) \equiv \int_0^t [v_0(t) - v_b(t)] dt \quad (18)$$
$$= d(t) + d_\varepsilon(t)$$

Figure 5B:
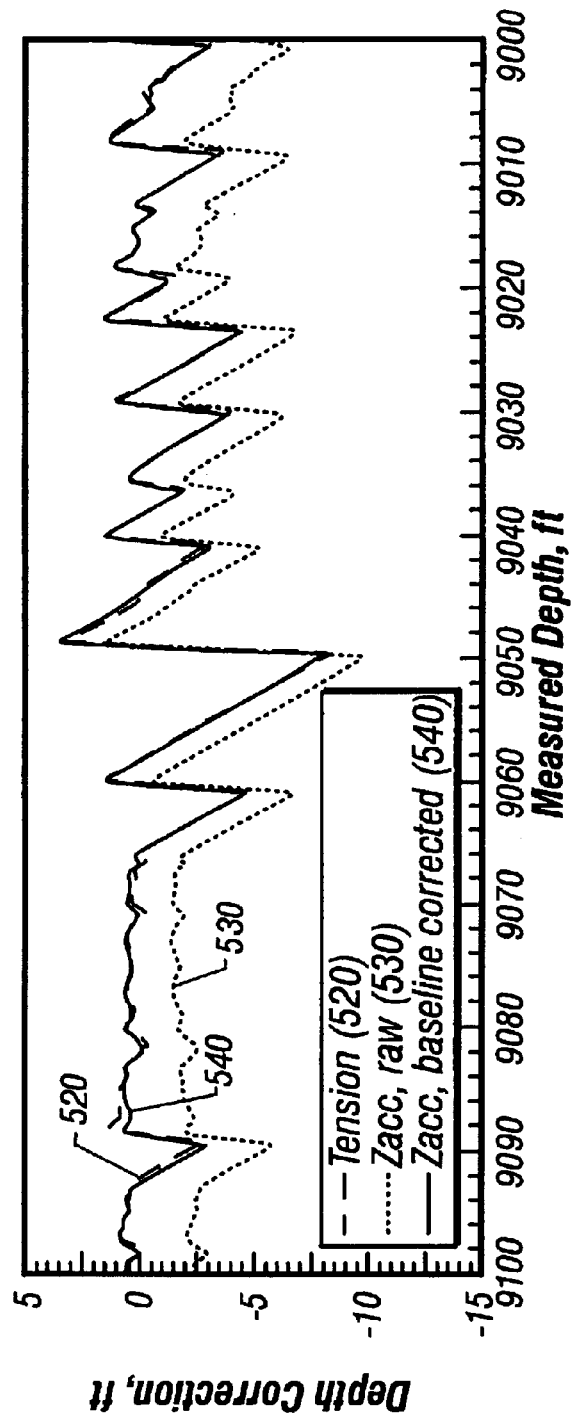
FIG. 5B is a graph of depth correction versus the measured logging tool depth.

The result of this integration is the true depth correction d(t) plus a slowly-varying offset $d_\varepsilon(t)$. FIG. 5B shows a graph of depth correction on the Y-axis as a function of measured depth on the X-axis. The dashed curve 520 represents the estimated depth correction from the tension measurement (i.e., $z_0(t)-z(t)$) computed using equation (4), and the dotted curve 530 represents the depth correction computed from the accelerometer (i.e., $d_0(t)-d(t)$) using equation (18). Because the curves 520, 530 are similar in character, they may appear to be interrelated, but they are fairly distinct from one another. The only relationship is that the tension was used to identify stuck sections, as described above, for determining the velocity error $v_\varepsilon(t)$ when deriving curve 530.

The two curves 520, 530 are similar in character, but the offset problem is evident. The background is estimated from the depth correction computed from the tension as given by equation (4) above. This requires an estimate of the background tension $f_{av}(t)$ computed from a very low pass filter. The difference between this and $d_0(t)$ from the accelerometer is then averaged with a low pass filter. This difference becomes the estimate of $d_\varepsilon(t)$. The background depth correction is then subtracted. The solid curve 540 in FIG. 5B shows how the baseline-corrected depth correction from the accelerometer compares with the tension-derived depth correction. This process gives the depth correction as a function of time, which must be added to the winch depth to get the corrected depth. The corrected depth is then used instead of the winch depth.

Figure 6A:
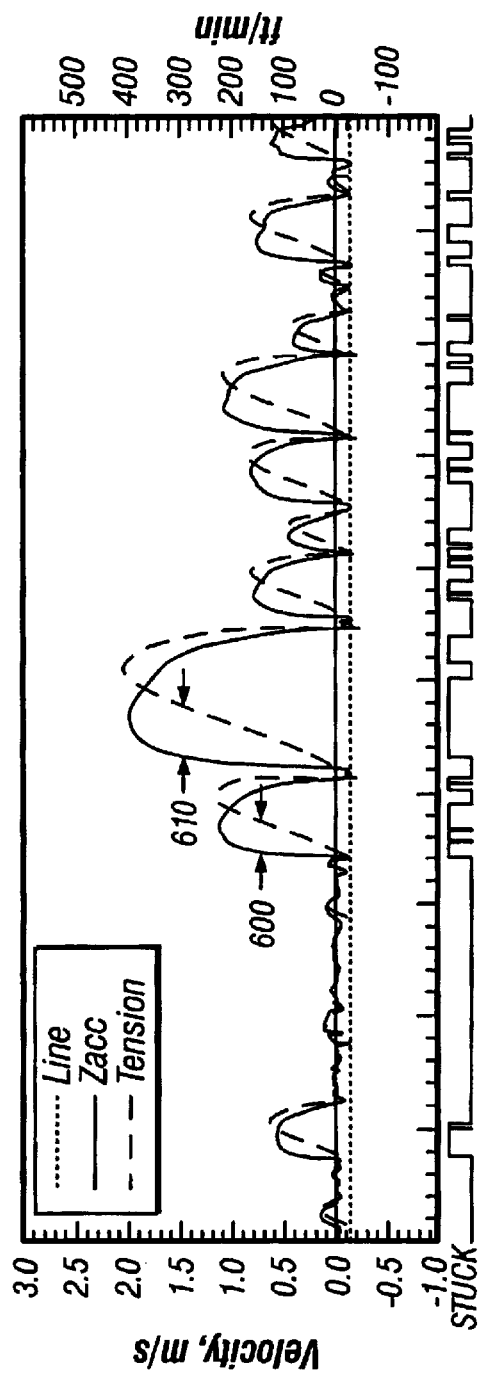
FIG. 6A is a graph of the FIG. 5A velocity data versus the speed-corrected tool depth.

FIG. 6 shows the result of speed correcting the depth by summing the depth correction curve 540 from the z-axis accelerometer 152 from FIG. 5B with the measured depth along the horizontal axis of FIG. 5B. In FIG. 6A, the data obtained during the stuck intervals is completely excised, and the intervals where the velocity is high is stretched to fill in the gaps. The very small depth offsets between the velocity curves 500 and 510 of FIG. 5A are magnified greatly in FIG. 6A such as at 600, 610.

Figure 6B:
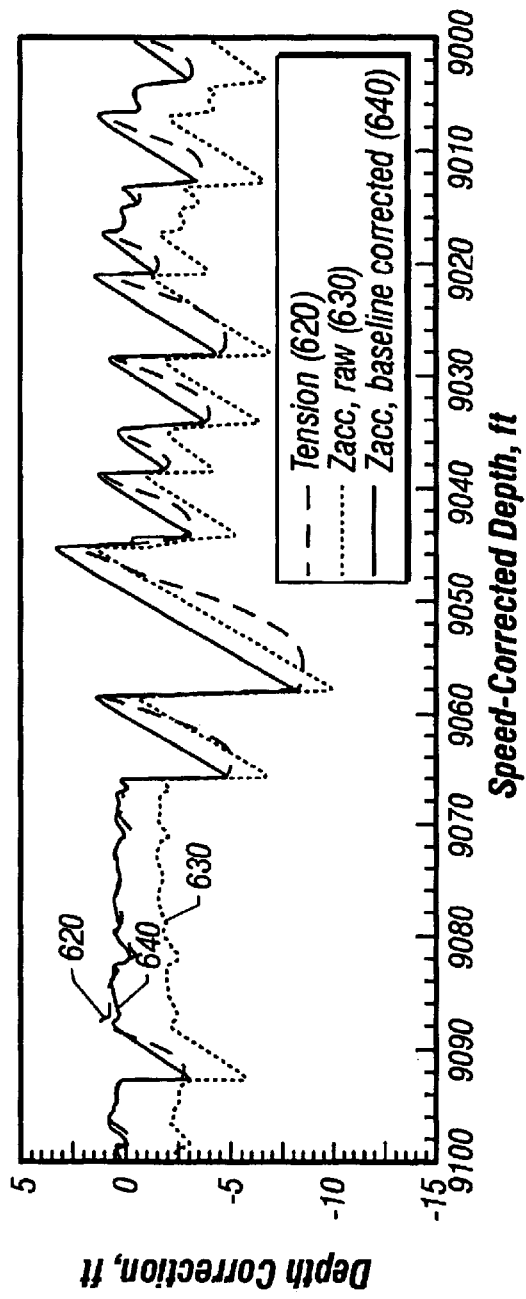
FIG. 6B is a graph of the FIG. 5B depth correction data versus the speed-corrected tool depth.

FIG. 6B shows the depth correction data of FIG. 5B replotted as curves 620, 630, 640 as a function of speed-corrected depth. In FIG. 5B, the tension-based curve 520 and the baseline corrected accelerometer curve 540 appear to follow one another closely, which may indicate that the tension-based curve 520 would be accurate enough to make speed corrections. However, the small offsets between curves 520, 540 in FIG. 5B are actually significant when that data is plotted against the speed-corrected depth as shown in curves 620, 640 of FIG. 6B.

Therefore, in application, the accelerometer-based depth correction values are added to the measured depth to get the speed-corrected depth (i.e. the actual depth) against which any data collected by the logging tool 150, such as resistivity, for example, is replotted. As shown by example in FIG. 6A, the data obtained during any stuck intervals is completely excised, and the data collected between such stuck intervals is stretched to fill in the gaps.

Figure 7:
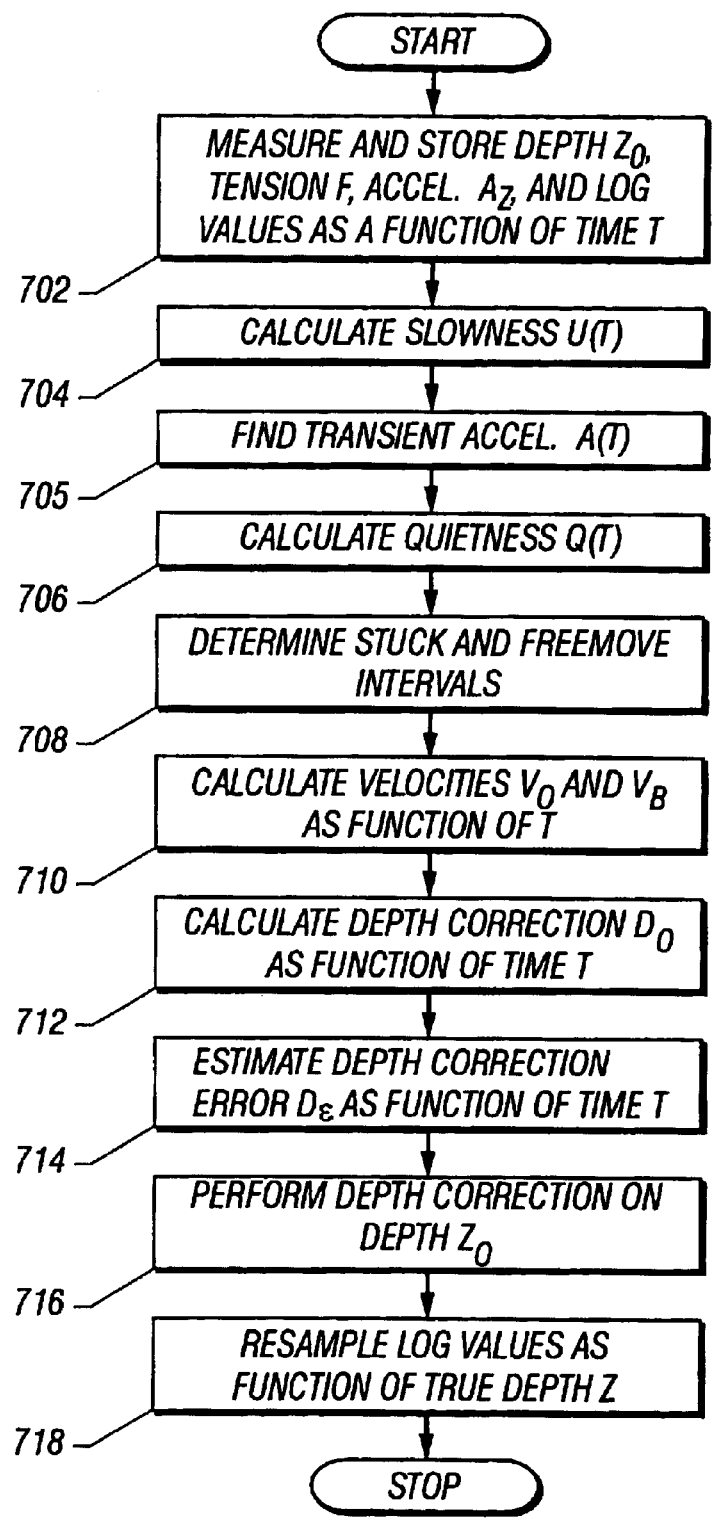
FIG. 7 is a flowchart summarizing the preferred embodiment.

FIG. 7 shows a flowchart that summarizes a preferred embodiment of the depth correction approach using the equations described above. Beginning with block 702, the depth $z_0(t)$ as measured by a depth encoder at the surface is sampled and stored as a function of time, as is the line tension f(t) as measured at the surface. Also sampled and stored are the acceleration $a_z(t)$ and log values of the downhole instruments. While these are preferably communicated to the surface, it is possible to sample and store these values separately as long as a common time clock can be later established.

In block 704, the slowness u(t) is calculated in accordance with equation (12). The operations in blocks 702 and 704 may be performed concurrently if desired. This would allow adjustment of the downhole instrument sampling rates to increase sampling frequencies when the tool is moving more quickly, and to decrease sampling frequencies when the tool is stuck or moving slowly. The SLOW and PINCHED flags are preferably also determined in this block.

In block 705, the transient acceleration a(t) is determined in accordance with equation (2). In block 706, the QUIET flag is calculated from the transient acceleration. In block 708, the QUIET and SLOW flags are used to determine intervals in which the tool is stuck or in which the tool is freemoving. If desired, the operations in blocks 702-708 may be performed concurrently. This would allow adaptive estimation of the stretch constant S from measurements obtained during the stuck intervals. The updated estimate of S could then be employed for improved calculation of the slowness u(t) in block 704.

In block 710, the accelerometer measurements are used to calculate an offset velocity $v_0(t)$ and a background velocity $v_b(t)$ in accordance with equations (16) and (17). The background velocity calculation requires knowledge of future freemove and stuck periods, so this operation is preferably not performed concurrently with the operations of block 702.

In block 712, the depth correction $d_0(t)$ is performed in accordance with equation (18). This calculation is then combined with a tension-determined depth correction in equation (4) and filtered to calculate a depth correction error $d_\varepsilon(t)$ in block 714. The values calculated in blocks 712 and 714 can then be used to calculate a "true" depth correction d(t) given in equation (18).

In block 716, the "true" depth correction d(t) is applied to the measured depth $z_0(t)$ to obtain an estimate of the true depth of the logging tool z(t):

$$z(t)=z_0(t)-d_0(t)+d_e(t) \qquad (19)$$

Then, in block 718, the data is preferably resampled to provide uniform depth sampling. The resampling may, for example, be done using linear interpolation of data samples neighboring the desired depth. Other interpolation techniques may alternatively be used.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein.

What is claimed is:

1. A method of well logging that comprises:
   moving a wireline tool through a wellbore using a cable;
   measuring tension in the cable f(t);
   measuring deployed length of the cable $z_0(t)$; and
   calculating a slowness value u(t) in accordance with:

$$u(t) = \frac{S \times z_0(t) \times f'(t)}{z'_0(t)},$$

wherein S is a stretch coefficient of the wireline.

2. The method of claim 1, further comprising:
   determining a "slow" flag that indicates whether the slowness value exceeds a predetermined threshold.

3. The method of claim 2, further comprising:
   measuring transient acceleration a(t) of the wireline tool with an accelerometer.

4. The method of claim 3, further comprising:
   integrating the transient acceleration a(t) to obtain an offset velocity $v_0(t)$.

5. The method of claim 4, further comprising:
   determining a "quiet" flag that indicates whether the acceleration a(t) is below a predetermined threshold for some predetermined time period; and
   combining the "slow" and "quiet" flags to determine intervals when the wireline tool is stuck.

6. The method of claim 5, further comprising:
   determining a "freemove" flag that indicates whether the wireline tool was not stuck for some predetermined time period.

7. The method of claim 6, further comprising:
   low-pass filtering the offset velocity $v_0(t)$ to obtain an average offset velocity $v_{0,av}(t)$; and
   calculating a background velocity $v_b(t)$ in accordance with:

$$v_b(t) \equiv \begin{cases} \overline{v_0(t)}; & \text{FREEMOVE} \\ v_0(t) - z'_0(t); & \text{STUCK} \\ \text{linearly varying with time}; & \text{otherwise} \end{cases}$$

8. The method of claim 7, further comprising:
   determining a depth correction $d_0(t)$ in accordance with:

$$d_0(t) = \int_0^t [v_0(\tau) - v_b(\tau)]d\tau.$$

9. The method of claim 8, further comprising:
   determining a depth correction error $d_e(t)$ in accordance with:

$$d_\varepsilon(t) = \overline{[d_0(t) - \{S \times z_0(t) \times [f(t) - f_{av}(t)]\}]},$$

wherein $f_{av}(t)$ is an estimate of the tension in the cable under smooth tool motion conditions.

10. The method of claim 9, further comprising:
    determining a true tool depth z(t) in accordance with:

$$z(t)=z_0(t)-d_0(t)+d_e(t).$$

11. The method of claim 10, further comprising:
    performing wireline logging measurements as a function of time; and
    transforming the wireline logging measurements as a function of time into wireline logging measurements as a function of true tool depth.

12. A well logging system that comprises:
    a logging sonde configured to move through a wellbore, wherein the logging sonde includes an accelerometer configured to measure acceleration of the logging sonde;
    a wireline cable that couples the logging tool to a reel on the surface;
    a distance sensor configured to measure reeled distance of the wireline cable;
    a tension sensor configured to measure tension in the wireline cable; and
    a surface computer configured to receive acceleration measurements from the accelerometer, distance measurements from the distance sensor, and tension measurements from the tension sensor, wherein the surface computer is further configured to determine "stuck" intervals in which the logging tool is stuck by finding "slow" intervals in which the wireline cable is stretching at about the same rate that the wireline cable is being reeled in.

13. The well logging system of claim 12, wherein the surface computer finds "slow" intervals by determining when a slowness value exceeds a predetermined threshold.

14. The well logging system of claim 12, wherein the surface computer's determination of "stuck" intervals further includes finding "quiet" intervals in which the accelerometer measurements deviate from an average acceleration by less than a predetermined threshold for a predetermined period.

15. The well logging system of claim 12, wherein the tension sensor is located at the surface.

16. The well logging system of claim 12, wherein the surface computer is further configured to determine the transient acceleration of the logging sonde, to integrate the transient acceleration of the logging sonde to obtain an offset velocity, to estimate a background velocity, and to integrate a difference between the offset velocity and the background velocity to determine a depth correction.

17. The well logging system of claim 16, wherein the surface computer estimates the background velocity by:

determining "stuck" intervals and setting the background velocity equal to a difference between the offset velocity and a linespeed, determining "freemoving" intervals and setting the background velocity equal to an average offset velocity, and linearly interpolating the background velocity between "stuck" and "freemoving" intervals.

18. The well logging system of claim 16, wherein the surface computer is further configured to combine the depth correction with the reeled distance measurements to determine a true depth of the logging sonde, and is still further configured to interpolate logging sonde measurements to generate uniformly sampled logging sonde measurements as a function of true depth.

19. A depth correction method for log measurements made as a function of time, the method comprising:

receiving acceleration measurements from an accelerometer located in a logging sonde;

receiving distance measurements from a depth encoder;

receiving wireline tension measurements from a tension sensor;

determining transient acceleration of the logging sonde form the acceleration measurements;

integrating the transient acceleration to determine an offset velocity;

estimating a background velocity;

integrating a differences between the offset velocity and the background velocity to determine a depth correction; and combining the distance measurements with the depth correction to determine a true depth of the logging sonde.

20. The method of claim 19, wherein the estimating a background velocity includes:

determining a first set of intervals in which the wireline is stretching at about the same rate that the wireline is being retrieved;

determining a second set of intervals in which the transient acceleration is below a predetermined threshold for at least a predetermined period of time; and determining a third set of intervals consisting of intervals that are contained in both the first and second sets.

21. The method of claim 20, wherein the estimating a background velocity includes:

setting the background velocity during the third set of intervals equal to a difference between the offset velocity and a line speed.

22. The method of claim 20, wherein the estimating a background velocity further includes:

determining a fourth set of intervals consisting of times outside the third set by more than a predetermined period of time;

setting the background velocity during the fourth set of intervals to a average offset velocity.

23. A method of well logging that comprises:

moving a wireline tool through a wellbore using a cable suspended by a winch;

measuring a length of cable spooled out to determine an estimated tool depth;

measuring a tension of the cable;

measuring an acceleration of the tool along a wireline axis using a downhole accelerometer;

differentiating the tension with respect to time;

estimating a tool velocity using a predetermined wireline stretch coefficient, the estimated tool depth, and the time-derivative of the tension; and identifying time intervals where the tool is stuck by determining time intervals in which the estimated tool velocity is low and in which the measured acceleration is near an average value.

24. The method of claim 23, further comprising:

time-averaging the measured acceleration to estimate gravity along the wireline axis;

subtracting the time-averaged acceleration from the measured acceleration to determine a transient acceleration;

integrating the transient acceleration with respect to time to produce an accelerometer-derived estimate of the tool velocity; and using the identified time intervals where the tool is stuck to correct an offset in the accelerometer-derived velocity.

25. The method of claim 24, further comprising:

integrating the offset-corrected velocity with respect to time to produce a tool depth correction;

using the identified time intervals where the tool is stuck and the estimated tool depth to determine a depth offset in the tool depth correction; and producing a corrected tool depth from the estimated tool depth, the tool depth correction, and the depth offset in the tool depth correction.

26. The method of claim 25, further comprising:

displaying logging data measured by the wireline tool as a function of the corrected tool depth.

* * * * *